(12) United States Patent
Stockhammer

(10) Patent No.: US 6,799,726 B2
(45) Date of Patent: Oct. 5, 2004

(54) AUTHORIZATION CONTROL DEVICE INCLUDING A WRISTWATCH HAVING A BIOMETRIC SENSOR

(75) Inventor: Rudolf Stockhammer, Gilgen (AT)

(73) Assignee: Skidata AG, Gartenau (AT)

( * ) Notice: Subject to any disclaimer, the term of this patent is extended or adjusted under 35 U.S.C. 154(b) by 0 days.

(21) Appl. No.: 10/181,671

(22) PCT Filed: Nov. 30, 2000

(86) PCT No.: PCT/EP00/12049

§ 371 (c)(1),
(2), (4) Date: Jul. 17, 2002

(87) PCT Pub. No.: WO01/54074

PCT Pub. Date: Jul. 26, 2001

(65) Prior Publication Data
US 2002/0190125 A1 Dec. 19, 2002

(30) Foreign Application Priority Data
Jan. 19, 2000 (DE) .......................... 100 01 929

(51) Int. Cl.⁷ .............................................. G06K 19/06
(52) U.S. Cl. ...................... 235/492; 235/382; 382/115; 340/5.52; 340/5.64; 340/5.82; 368/10
(58) Field of Search ................................ 235/380, 382, 235/382.5, 439, 492; 705/13, 18, 44; 382/115, 116, 117, 118, 124; 340/5.1, 5.52, 5.53, 5.6, 5.61, 5.64, 5.65, 5.8, 5.81, 5.82, 5.83, 5.84; 713/202, 182; 368/10; 42/70.11; 600/344

(56) References Cited

U.S. PATENT DOCUMENTS

| | | | | |
|---|---|---|---|---|
| 5,446,265 A | * | 8/1995 | McAllister | 235/382 |
| 6,126,078 A | * | 10/2000 | Locher et al. | 235/492 |
| 6,507,662 B1 | * | 1/2003 | Brooks | 382/115 |
| 6,529,754 B2 | * | 3/2003 | Kondo | 600/344 |
| 2003/0014642 A1 | * | 1/2003 | Martinsson et al. | 713/182 |
| 2003/0037264 A1 | * | 2/2003 | Ezaki et al. | 713/202 |
| 2003/0070343 A1 | * | 4/2003 | Glock | 42/70.11 |
| 2003/0103414 A1 | * | 6/2003 | Lyon | 368/10 |
| 2003/0174049 A1 | * | 9/2003 | Beigel et al. | 340/5.61 |
| 2003/0189488 A1 | * | 10/2003 | Forcier et al. | 235/492 |

FOREIGN PATENT DOCUMENTS

| | | |
|---|---|---|
| DE | 27 19 341 C3 | 11/1978 |
| DE | 34 33 194 A1 | 4/1985 |
| DE | 196 07 157 A1 | 2/1997 |
| DE | 196 48 767 A1 | 6/1997 |
| DE | 198 22 206 A | 11/1999 |
| EP | 06 91 822 B1 | 1/1996 |
| GB | 2 156 127 A | 10/1985 |
| GB | 2 181 582 A | 4/1987 |
| JP | 10-127609 A * | 5/1998 |
| JP | 2003-85540 A * | 3/2003 |
| WO | WO88/04153 | 6/1988 |
| WO | WO98/12670 A | 3/1998 |

OTHER PUBLICATIONS

PCT App. No. PCT/EP00/12049 International Preliminary Examination Report, Mar. 2002.

* cited by examiner

Primary Examiner—Jared J. Fureman
(74) Attorney, Agent, or Firm—Flynn, Thiel, Boutell & Tanis, P.C.

(57) ABSTRACT

A data carrier intended to be worn by an individual for regulating the authorization of the individual into an access controlled location. The data carrier includes a sensor for monitoring a biometric feature of the individual. Internal to the data carrier is a chip in which previously read biometric data are stored. If the data read by the sensor are identical to the stored data, a read out device integral with the data carrier will broadcast a release signal.

11 Claims, 1 Drawing Sheet

AUTHORIZATION CONTROL DEVICE INCLUDING A WRISTWATCH HAVING A BIOMETRIC SENSOR

FIELD OF THE INVENTION

This invention relates to a device for controlling a person's authorization upon utilization of a service with a data carrier that communicates with a reader.

BACKGROUND OF THE INVENTION

In order to prevent abusive use, data carriers, in particular smart cards, are nowadays used with a PIN number. Since the user must remember different numbers for different smart cards, there is a danger of him confusing or forgetting the individual PINS. This increases the error rate in smart card use, which e.g. results in even longer waiting lines than are already caused by PIN entry at peak times.

DE 19648767 A1 discloses a device wherein the data carrier is formed by a smart card in which the authorized person's fingerprint is stored and which is provided with a sensor that detects the user's fingerprint. If the comparison yields a match when the smart card is inserted into the reader, the actual smart-card function, for example access, is released.

It is also known, for example, from WO 88/04153 and EP 0691822 B1 to identify persons by the patterns of their subcutaneous blood vessels. The relevant person's hand is positioned by the grasping of a handle or the like and the infrared emission spectrum of the back of the hand then measured.

Compared to smart cards and similar data carriers that must be inserted into a reader, contactless-type data carriers, which cooperate with the reader in the radio wave range over a relatively large data transfer distance, have the advantage of being able to be fastened to clothing in the form of a card or integrated into a wristwatch for example, i.e. used "hand-free."

Accordingly, contactless-type data carriers are preferably used for example with access control devices of ski lifts and cable cars, which generally have a person singling device, such as a turnstile, which is operated by the reader, i.e. unblocked for a person, when the reader receives corresponding data from the data carrier. Since a PIN code and a fingerprint sensor are out of the question for skiers, if only because of the gloves skiers wear, the nontransferable data carrier is nowadays usually combined with a photo fastened to the skier's clothing in order to prevent transfer to other persons. However, show the photo involves considerable effort.

SUMMARY OF THE INVENTION

The object of the invention is therefore to provide a contactless-type data carrier with nontransferable, personal authorization to utilize a service, for example for the passenger conveyors of a skiing area, that prevents abusive transfer to other persons.

This is obtained according to the invention by forming the contactless-type data carrier by an object worn on the skin and provided with a sensor detecting biometric identification feature of the skin.

The object worn on the skin may be a garment, for example a glove or headband. However, especially preferred objects are ones worn independently of the ambient temperature, for example a bracelet, wristwatch or ring.

The biometric skin identification features detected by the sensor may be of different kinds. For example the skin furrow relief can be detected. The measurement of this feature is described in DE 2719341 C3 or DE 3433194 A1.

However, an infrared sensor is preferably used. This sensor is positioned on the object so as to rest on the skin and reliably detect the subcutaneous pattern of arteries, veins, capillaries and other blood vessels thereunder.

Since the hand has a special individual, intensive subcutaneous blood vessel pattern, the inventive object is preferably worn with the sensor in this area. Accordingly, the data carrier used according to the invention is a bracelet, wristwatch, ring or glove, in order to communicate contactlessly with the reader, on the one hand, and for the sensor at the same time to detect the biometric skin identification features in the area of the hand, i.e. the biometric skin identification features on the back of the hand (glove), a finger (ring) or the wrist (bracelet or watch). Compared to other objects worn on the skin, for example a headband, the abovementioned objects worn on the hand have the additional advantage of resulting in a corresponding positioning of the sensor in the hand area whose biometric skin identification data have been stored, since they are more or less always worn at the same place.

The data of the biometric features to be identified can be read and stored in a chip in the wristwatch or other data carrier worn on the skin. The chip, at the same time, forms the means for comparing the stored biometric identification feature with the detected biometric data. If the comparison yields a match of the biometric data read and stored in the chip with the biometric data measured by the sensor, a data transaction with the reader is effected with the transponder for noncontacting data transfer in the object worn on the skin, thereby releasing the access control device.

Further, it is possible to store the biometric data to be identified of the access-authorized persons of the relevant access control device in a memory associated with the reader or in a central processing unit with which the reader is connected on- or off-line. The reader or central processing unit thus also contains the means for comparing the stored biometric data to the detected biometric data. Finally, the biometric data to be identified can be stored both in a chip in the particular data carrier worn on the skin and in the reader or central processing unit if especially high security requirements are necessary.

In order to prevent unauthorized readout and changing of the data, the biometric data can be stored in a cryptologically protected memory area that is not freely accessible.

The reader is formed to radiate electromagnetic waves, in particular in the radio wave range. It has, for this purpose, coils and capacitors, resonant circuits, optocouplers and the like. The data carrier, which is preferably formed as a transponder, likewise has devices such as coils, capacitors, resonant circuits, optocouplers for nongalvanic energy and/or data transfer, so that energy and/or data are transferred between the data carrier and the reader.

The sensor is preferably set in operation by the transponder only when the data carrier is located at the transaction distance from the reader.

The inventive device is employable for example in tourist areas to register authorizations for access to ski lifts, cable cars and other tourist facilities, such as indoor swimming pools, parking garages and values for cashless payment transactions in restaurants, sport stores, etc.

However, the inventive device is, of course, not limited to tourism. Rather, such a contactless-type data carrier can be used for a great variety of applications, for example the utilization of public transport systems, as an electronic purse and the like, i.e. in particular as a multifunctional data carrier that is employable for as many applications as possible, even as the only personal data carrier with which a person can utilize practically all services that can be controlled with a reader.

BRIEF DESCRIPTION OF THE DRAWINGS

In the following description, the invention will be explained in more detail by way of example with reference to the enclosed drawings wherein.

DETAILED DESCRIPTION

Figure 1:
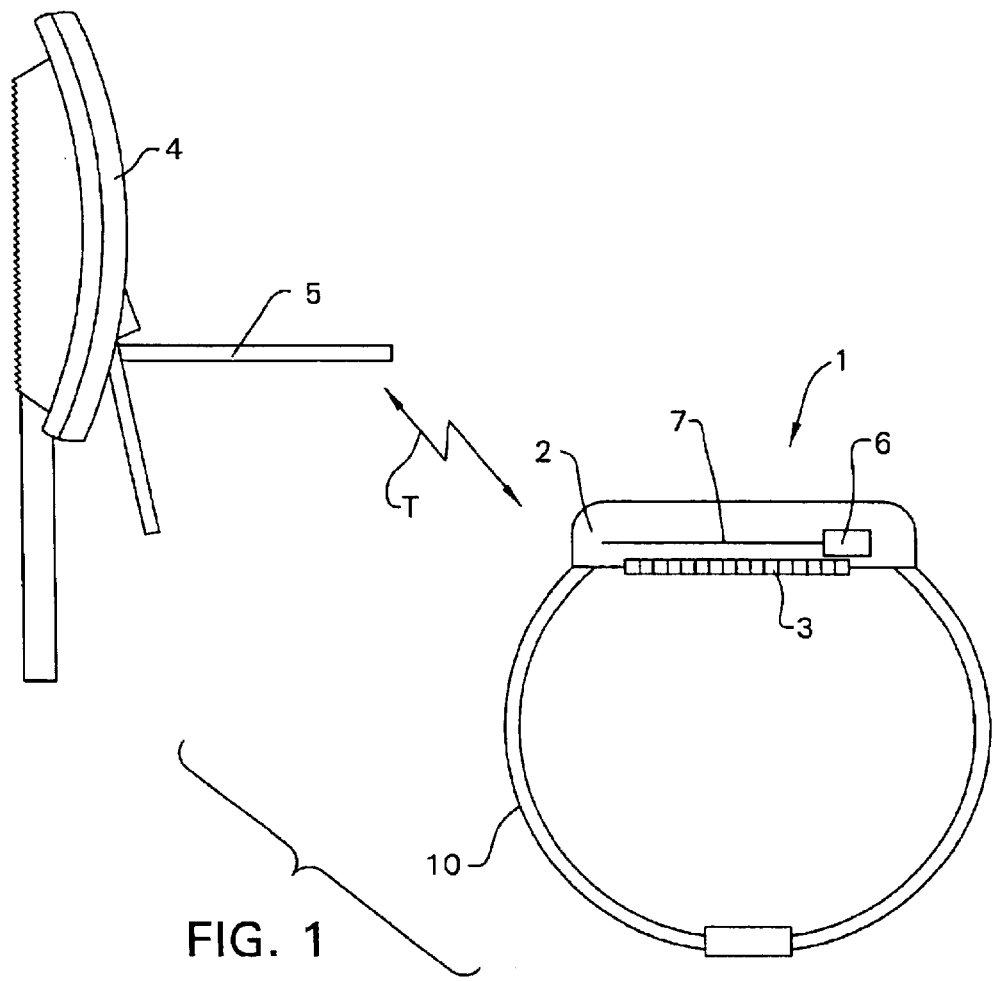
FIG. 1 is a diagrammatic illustration of the components of the system of this invention for controlling personal authorization.

As seen in FIG. 1, the invention includes a wristwatch 1 for indicating time. Wristwatch 1 includes a case 2 dimensioned to be worn against the wrist of an individual for holding a timekeeping assembly, (wrist and timekeeping assembly not shown). A strap 10 holds the case 2 to the wrist. An infrared sensor 3 is mounted to an undersurface of the case 2 so as to be directed to the wrist. Infrared sensor 3 is configured to detect the pattern of subcutaneous blood vessels on the wrist.

Wristwatch 1 forming the data carrier also has a transponder with chip 6 and antenna coil 7 for the data transaction according to arrow T with reader 4 on access control device 5, which is formed as a turnstile.

Figure 2:
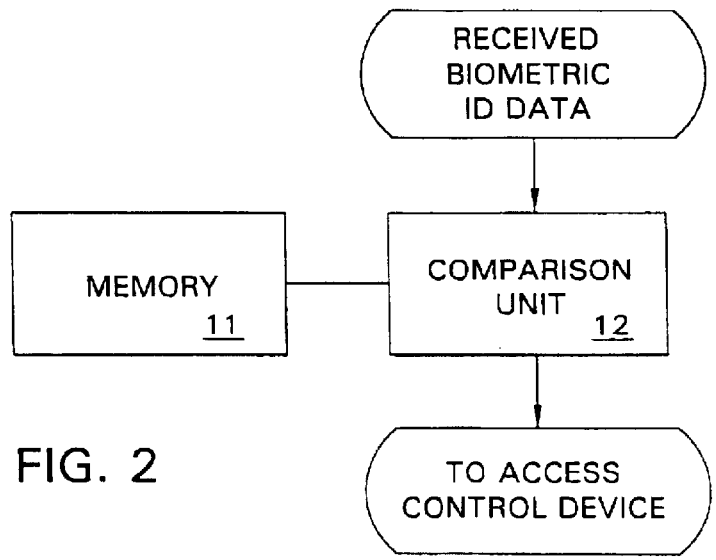
FIG. 2 is a block diagram of the relationship between the memory means and the comparison means.

The relevant person's subcutaneous blood vessel pattern data measured by sensor 3 are supplied to chip 6 and transferred contactlessly with antenna 7 to reader 4 which is connected on- or off-line with a central processing unit in which the biometric skin identification data of the access-authorized persons are stored in a memory 11 (FIG. 2). A comparison unit 12 is receives the sensed biometric identification data and is connected to the memory. The comparison unit 12 compares the sensed biometric identification to the stored data. If the comparison yields a match, access control device 5 is released.

What is claimed is:

1. An authorization system, said system comprising:
   a wristwatch for indicating time;
   a reader separate from said wristwatch and configured to emit and receive electromagnetic waves;
   said wristwatch including:
      a case dimensioned to be worn on a wrist of an individual for holding a time keeping assembly;
      a strap for holding said case to the wrist; and
      an antenna disposed in said case for receiving the electromagnetic waves emitted by said reader;
      a sensor mounted to said case and directed towards the wrist, said sensor configured to only detect biometric identification features of the wrist or hand of the individual when the electromagnetic waves received over said antenna indicate said wristwatch is within a select distance of the reader;
   means connected to said case and said reader for performing contactless communication of data from said sensor to said reader, the data being based on the biometric identification features detected by said sensor; and
   a memory and a means for comparing biometric identification features disposed in said case or connected to said reader, said memory storing biometric identification features to be identified and said means for comparing configured to compare the biometric identification features detected by said sensor to the stored biometric identification feature data and to produce an output as a function of the comparison.

2. The system of claim 1, wherein said memory and said means for comparing biometric identification features are contained in said case.

3. The system of claim 1, wherein said memory and said means for comparing biometric identification features are connected to said reader.

4. The system of claim 1, wherein said sensor is an infrared sensor.

5. The system of claim 1, wherein said sensor is configured to detect a pattern of subcutaneous blood vessels.

6. A wristwatch for indicating time and providing biometric identification data about an individual, said wristwatch including:
   a case dimensioned to be worn on the wrist of an individual for holding a timekeeping assembly;
   a strap attached to said case for holding the case to the wrist;
   an antenna disposed in said case for receiving electromagnetic waves emitted by a reader;
   a sensor mounted to said case and directed towards the wrist, said sensor configured to only detect biometric identification features of the wrist or hand of the individual when electromagnetic waves received over said antenna indicate said wristwatch is within a select distance of a reader; and
   a transmitter mounted in said case to transmit data regarding the biometric identification features detected by said sensor to a reader.

7. The wristwatch of claim 6, wherein:
   a memory is disposed in said case, said memory storing data representative of the biometric identification features of an authorized individual; and
   a means for comparing is disposed in said case, said means for comparing connected to said sensor for receiving the detected biometric identification features and the stored biometric identification feature data and configured to compare the detected biometric identification features to the stored biometric identification feature data and, based on the comparison, generate an output signal.

8. The wristwatch of claim 6, wherein said sensor is an infrared sensor.

9. The wristwatch of claim 6, wherein said sensor is configured to detect a pattern of subcutaneous blood vessels.

10. The wristwatch of claim 6, wherein said sensor is an infrared sensor configured to detect a pattern of subcutaneous blood vessels.

11. The wristwatch of claim 6, wherein said transmitter includes an optocoupler.

* * * * *